April 12, 1966  R. STANISH  3,246,259
ELECTROMECHANICAL TRANSDUCER AND SYSTEMS RELATING THERETO
Filed May 9, 1962
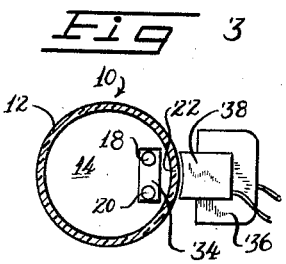
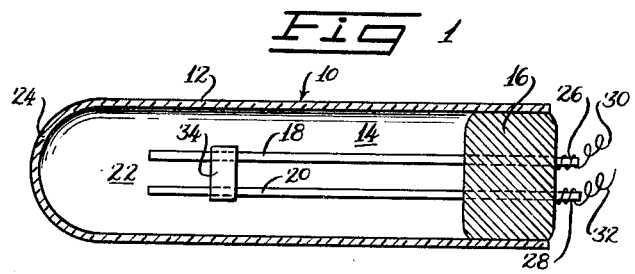
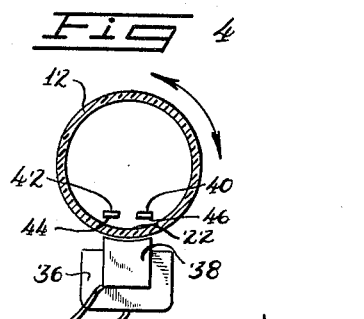
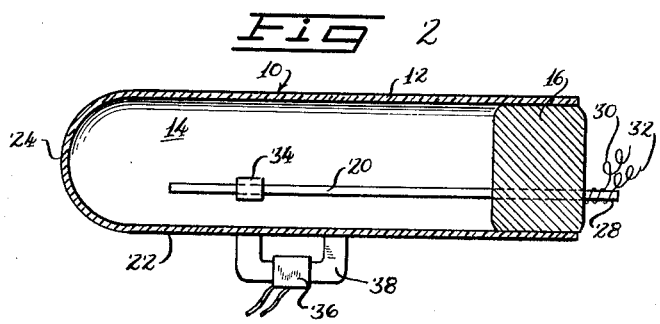
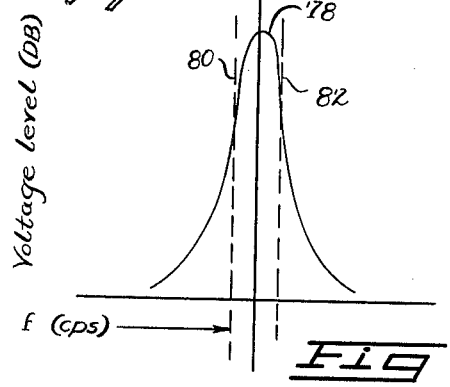
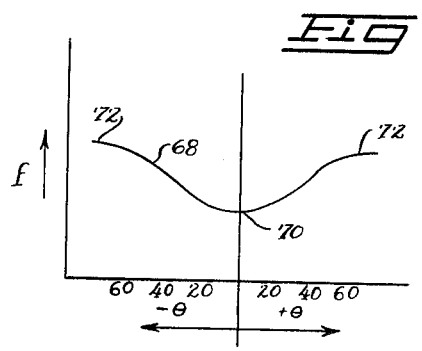
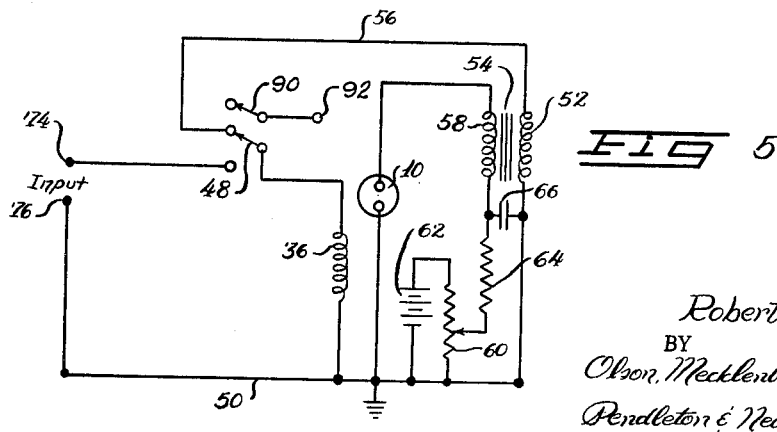
INVENTOR.
Robert Stanish
BY
Olson, Mecklenburger, von Holst,
Pendleton & Neuman  Attys

United States Patent Office 3,246,259
Patented Apr. 12, 1966

3,246,259
ELECTROMECHANICAL TRANSDUCER AND
SYSTEMS RELATING THERETO
Robert Stanish, Chicago, Ill., assignor to Vibrionics Research Co., Lombard, Ill., a corporation of Illinois
Filed May 9, 1962, Ser. No. 193,520
15 Claims. (Cl. 331—126)

This invention relates to an improved electromechanical transducer and circuits and apparatus associated therewith. More particularly this invention relates to a transducer including a mechanically displaceable element capable of generating a variable electrical phenomenon directly related to the displacement thereof whereby the transducer may be employed in unique systems relying upon such phenomenon.

There are many circumstances in the electronics field where it is desirable to convert mechanical motion into an electrical signal. Many transducers have heretofore been proposed which accomplish this desideratum in various ways and with varying success. Typical of such devices adapted for static displacements are rotatable elements such as potentiometers and variable transformers, linear devices such as sliding wires, tuned sections of wave guide or parallel lines, and distortion sensitive devices such as strain gauges and the like. For dynamic applications such as vibration analysis and the study of resonant phenomenon vibrating reeds, contacts, and visual indicators are most common. Each of these devices has had impediments preventing universal use, the impediments including high cost, complexity, high power requirements, the necessity of amplifiers and auxiliary equipment, lack of accuracy and the like.

There has been a particular need in the art for an inexpensive yet accurate oscillatory device which can be tuned to a specific periodic frequency and accurately control related circuits or provide a clear indication of the presence of a signal of the predetermined frequency. Such devices are useful in oscillators, frequency sensitive switches, decoding devices to sense a variable frequency code, frequency standards, narrow band pass filters and frequency or period sensitive devices of all kinds where the variable is converted into a periodic electrical signal.

The instant invention provides an improved system and apparatus to satisfy all of the foregoing needs. It is one important object of this invention to provide an improved transducer in which mechanical displacement of a portion thereof alters an electrical signal which is directly related to the displacement.

It is another object of this invention to provide an improved electromechanical transducer which is simple in construction, requires no elaborate equipment and is capable of producing a variable electrical current directly related to the mechanical displacement of an element thereof.

It is still a further object of this invention to provide an improved resonant device adapted to produce an electrical indication of the existence of a predetermined periodic electrical or mechanical phenomenon.

Another object of this invention is the provision of an improved resonant system capable of accurately selecting a periodic signal having a single desired frequency and generating a control signal in response thereto while rejecting other signals having only slightly different periodicity.

Another object of this invention is the provision of an improved oscillatory circuit having greatly increased signal capabilities while providing excellent wave form and minimum power inputs.

Still another object of this invention is the provision of a stable oscillator system having no active elements such as vacuum tubes, transistors or the like.

Another object of the invention is the provision of an improved resonant device employing a resonant element which can be tuned over a limited range.

Further objects of this invention will become manifest from a consideration of this specification, the accompanying drawings and the appended claims.

In one form of this invention a small nonconductive cylindrical envelope is sealed with two electrodes extending into the cavity defined thereby, the electrodes being suspended as cantilevers from one end of the envelope and the envelope being charged with an ionizable gas such as neon. It is preferred that the electrodes be spaced from the longitudinal axis of the envelope for optimum output, although the device can be operated with reduced efficiency where the electrodes are disposed substantially on the longitudinal axis. It is also preferred that the electrodes be so designed or so restrained that there will be little or no movement of the two electrodes with respect to one another, the movement being substantially unitary movement of the two electrodes with respect to the gas within the envelope and with respect to the envelope itself.

While in the preferred form of the invention disclosed in detail hereinafter an electromagnetic device is employed to produce mechanical displacement of the electrodes with respect to the envelope, it will be apparent that other techniques could be employed although they will involve additional mechanical linkages, seals and the like. There are also provided in the detailed disclosure of this specification two specific systems employing the unique transducer, these systems being characterized by unexpected and unforeseeable advantages of high gain, simplicity, and high frequency selectivity. However many additional uses will immediately occur to one skilled in the art where the characteristics of the instant transducer can be employed to advantage.

For a more complete understanding of this invention, reference will now be made to the accompanying drawings wherein:

FIG. 1 is a longitudinal sectional top view of one embodiment of the invention;

FIG. 2 is a longitudinal sectional side view of the embodiment of FIG. 1;

FIG. 3 is a cross sectional view of the embodiment of FIG. 1;

FIG. 4 is a cross sectional view of an alternate embodiment of the invention similar in many respects to the embodiment of FIG. 1;

FIG. 5 is a circuit diagram illustrating two systems employing the electromechanical transducers shown in FIGS. 1-4;

FIG. 6 is a typical frequency response curve for the transducers illustrated in FIGS. 1-4; and FIG. 7 is a chart illustrating the tunable feature of the instant invention.

Referring now to the drawing, and more particularly to FIGS. 1-3, an electromechanical transducer 10 is illustrated including an open ended cylindrical glass envelope 12 filled with an ionizable gaseous medium 14 and sealed at one end with an appropriate plug 16 which may also be glass or any other gas impervious material which will form a seal with the material of which the envelope is made. Two electrodes 18 and 20 are secured in the plug 16 and extend longitudinally into the envelope 12. As shown clearly in FIGS. 2 and 3, the electrodes 18 and 20 are offset substantially from the longitudinal axis of the envelope 12, and are preferably quite close to a wall portion 22 of the envelope. While in the illustrated embodiment the electrodes extend substantially the entire length of the envelope 12 to a point adjacent the sealed end 24, the precise length is not critical, the length of the electrodes 18 and 20 being determined by the desired mechanical and resonant properties thereof, and the length of the envelope being at least sufficient to encase the electrodes.

In the particular embodiment described the electrodes 18 and 20 extend through the end plug 16 to define two terminals 26 and 28. The terminals are relatively short and rigid so that flexible conductors 30 and 32 may be attached thereto by any conventional technique such as soldering, wrapping or the like. The flexible conductors 30 and 32 may be connected into a multiplicity of circuits, several of which will be described hereinafter in substantial detail.

It is possible to obtain many of the advantages of this invention by providing a single movable electrode secured as a cantilever in the end plug 16. While a second electrode, in some form, is essential, it may be secured along the surface of the envelope 12, preferably spaced from the wall portion 22, or it could be an aquadag or similar conductive coating on the nonconductive wall of the envelope 12. In any event it is quite significant that the fixed electrode be spaced away from the movable electrode and also spaced away from the adjacent wall portion 22 of envelope 12 for optimum output characteristics.

A small nonconductive tie bar 34 is secured between the cylindrical electrodes 18 and 20 in the embodiment of FIGS. 1-3. This tie bar 34 is intended to restrain the two electrodes 18 and 20 against movement relative to one another and to move the two electrodes as a unit in a direction substantially normal to the surface of the envelope wall portion 22. The tie bar 34 will also affect the inertial characteristics of the electrodes, and thus if the electrodes are driven in an oscillatory manner, the tie bar 34 will be a significant factor in establishing the resonant frequency at which the electrodes will move. In standard production of these units, the frequency may be preset over a substantial range during manufacture by appropriately positioning the tie bar 34, although this is not the principal purpose of the bar.

The electrodes 18 and 20 may be moved by various techniques. In the illustrated embodiment an electromagnet including a winding 36 and a fixed core 38 are disposed adjacent the wall portion 22 of the envelope 12 and the core is so oriented that a magnetic flux field is generated which will include within its path the electrodes 18 and 20. Thus by the laws of magnetics, energization of the coil 36 will result in a field which will cause the two electrodes to be attracted toward the poles of core 38 and will also cause the two electrodes to be attracted to one another. As the electrodes 18 and 20 are restrained against relative movement by the tie bar 34, substantially all of the movement will be normal to the envelope wall 22. While the device is operative without the tie bar 34 in place, it has been found that relative movement between the two electrodes produces spurious signals in the device at other than the desired frequency.

For the described embodiment to operate it will be apparent that the electrodes 18 and 20 must be of a magnetically attractable material. In one embodiment of the invention two steel rods are employed which are approximately two inches long and .015 inch in diameter. The electrodes may be displaced by other techniques although magnetic deflection is the simplest and preferred. Electrostatic deflection could be employed, or with proper seals, mechanical linkage for external manipulation could be utilized. It is also possible, in the cases of oscillatory phenomenon to use electrodes of substantial mass and physically move the envelope, thus producing relative movement between the envelope and the electrodes as a result of the inertia of the electrodes.

In the preferred embodiment of the invention the envelope 12 was evacuated and then filled with neon gas.

It was found that the device operated over a wide range of gas pressures and the optimum gas pressure appears to be dependent upon the other physical characteristics of the design including the spacing of the electrodes, the diameter of the envelope and the position of the electrodes with respect to the adjacent envelope wall 22. Substantial outputs are produced for example when employing neon gas pressures in the range of 1.5 to 10 millimeters of mercury. However, with an envelope having a diameter of 10 millimeters the output appears to be optimum in both amplitude and linearity when employing gas pressures in the range of about 1.5 to 5 mm. (Hg) and even greater efficiency and linearity is attained with pressures in the range of 2 to 3.5 mm. (Hg). While neon appears to be the most desirable gaseous medium because of its availability and low cost, any ionizable medium including krypton, argon, xenon and the like, or mixtures of various gases may be employed. It is obvious that the artisan must relate the physical dimensions of the various components to the gas characteristics to optimize output and linearity of the device.

An alternate embodiment of the invention is illustrated in FIG. 4. The operation and construction are substantially the same as already described with respect to FIGS. 1-3. The envelope 12 has one closed end, the other end being closed by an appropriate sealing plug. An electromagnet including a winding 36 on a core 38 is disposed adjacent one portion 22 of the envelope 12 and is so oriented that the lines of flux pass longitudinally within the cavity defined by envelope 12. The cavity is charged with an appropriate ionizable gas such as neon. In the embodiment of FIG. 4, however, the electrodes 40 and 42 are formed of a flat resilient material such as spring steel or the like and are mounted within the plug so that the electrodes are substantially coplanar, that is the flat surfaces thereof are substantially coplanar. The flat surfaces 44 and 46 of the electrodes 40 and 42 are spaced from and facing the envelope wall portion 22.

By employing flat stock in the manufacture of the electrodes the need for the tie bar employed in the embodiment of FIGS. 1-3 is eliminated due to the inherent resistance of the electrodes to movement in the plane of the material. Thus when appropriately energized the two electrodes 40 and 42 will move together toward and away from the wall portion 22 without substantial movement relative to one another.

The circuit diagram of FIG. 5 illustrates two important and unique uses of the transducers described above. The single circuit is adapted for use as a stable oscillator and as a frequency sensitive or frequency responsive unit. The mode of operation is determined by the position of the switch 48. As shown in FIG. 5 a double pole double throw switch including switch section 48 is in the upper position whereby the circuit is connected as an oscillator. When switch 48 is thrown to the lower position the circuit is adapted for use as a frequency sensitive device, filter, or decoder. The movable arm of switch 48 is connected to one terminal of the winding 36 of the electromagnet and the other terminal of winding 36 is connected to a common or ground bus 50. The winding 36 is energized from one winding 52 of a transformer 54 through conductor 56, the other terminal of transformer winding 52 being connected to the ground bus 50. The other winding 58 of transformer 54, which in this mode of operation may be considered as the primary winding, has one terminal connected to one electrode of the transducer 10. The other electrode of the transducer 10 is connected to the ground 50.

A potentiometer 60 is connected across a potential source such as battery 62 and one common connection of the battery and potentiometer is connected to ground 50. The wiper of potentiometer 60 is connected through a resistor 64 to the transformer winding 58. A capacitor 66 is connected across the corresponding terminals of the windings 52 and 58. With the foregoing arrangement of components, closure of switch 48 produces a small current in electromagnet winding 36 which attracts the electrodes within the transducer 10. Movement of the electrodes within the transducer results in a change in the current through the transducer, and consequently a change in the current in transformer winding 58. This change results in additional current in the transformer winding 52 which in turn further energizes the electromagnet winding 36. Thus, in accordance with the well known principles of oscillating circuits the electrodes move in one direction to the limits of the available travel, and thereafter the current through the electrodes tends to stabilize and consequently the current in the transformer winding 52 diminishes, resulting in reduced flux in the electromagnet winding 36 and return of the electrodes to the relaxed position. This phenomenon repeats with a periodicity principally dependent upon the resonant characteristics of the electrodes.

The foregoing oscillator circuit has been found to be extremely stable and reliable in use. It produces good waveform for all normal operation and is stable for changes in temperature, operating voltages, and other circuit characteristics over wide ranges of values. The circuit has one additional important feature not available in mechanically controlled oscillators heretofore known. The oscillator can be tuned over a limited frequency range by rotating the envelope 12 about its longitudinal axis. By changing the relative positions of the electrodes and the flux field, the frequency of operation can be altered in accordance with the chart, FIG. 7. In one typical embodiment of the invention described above the envelope was rotated relative to the field through angles of approximately 60° in the clockwise and counterclockwise directions as diagrammatically indicated by the arrow in FIG. 4 producing frequency variations as shown by the curve 68 on the chart. In the particular embodiment the center frequency indicated by node 70 was about 266 cycles per second and as the envelope was rotated this frequency increased as shown by the ends 72 of curve 68 where the frequency was about 269 cycles per second. While the percentage change is only in the order of about one to two percent this can be extremely important in quality control and calibration of frequency sensitive devices such as decoders in mobile telephone systems and the like.

When the switch 48 of FIG. 5 is thrown to the lower position a signal containing random or coded frequencies may be applied at the input terminals 74 and 76. Terminal 76 is connected to ground 50 and terminal 74 is connected through switch 48 to the electromagnet winding 36. Winding 36 will thus be energized with any signal applied thereto, but because of the mechanically resonant character of the electrodes, the electrodes will remain substantially non-responsive to all but the frequency to which they are tuned. At the resonant frequency of the reeds or electrodes the motion will be substantial, producing very substantial variations in the current flowing in the circuit which includes the electrodes, the transformer winding 58, resistor 64 and the combination of potentiometer 60 and battery 62.

An output terminal 92 is connected to transformer winding 52 by the second pole 90 associated with switch 48 and thus winding 52, in this configuration, becomes an output or secondary winding. The output at terminal 92 varies with frequency in accordance with curve 78 of FIG. 6 and thus this is a chart of quality or circuit "Q." As is apparent from the curve, the circuit has a relatively high equivalent Q, and is thus highly frequency selective. In the embodiment described where the resonant frequency is about 266 c.p.s., the half power points, indicated by broken lines 80 and 82 occur at about 264 c.p.s. and 268 c.p.s. respectively. It is believed that even greater selectivity can be attained through careful selection of components and precision in the manneor of manufacture of the electrode and associated parts.

While several specific embodiments of the invention have been described in some detail, other systems using the unique transducer and modifications of the transducer will immediately occur to one skilled in the art. It appears that the unusual characteristics observed in this invention are a result of variable current flowing between the electrodes as a result of the proximity of the electrodes to a wall such as the wall of envelope 12. As the electrodes move toward the glass wall portion 22 the current will change or vary. It is probable that this phenomenon is the result of the progressive variation and reconstruction of the space charge or ion field which surrounds the electrodes during conduction.

The effect may be produced by placing the moving electrode or electrodes close to the envelope as described above or an equivalent wall may be created through the use of auxiliary devices. Included among the auxiliary devices contemplated are mechanical devices such as a non-conductive wall or barrier mounted within the envelope and electrical devices such as a rigidly mounted biased electrode to create an effective electrical wall.

It has been found that the gas within the envelope should be ionized for best results and thus it is necessary to provide a sufficient voltage between the electrodes to insure ionization, but a limited current to prevent arc discharge. In the described embodiment a voltage of 400 volts in source 62 with a one megohm potentiometer 60 connected thereacross was found satisfactory. It appears that with these parameters and the gas and circuit parameters given above the space charge around the electrodes is effectively altered by motion toward the envelope wall in such a manner that the current is reduced in a generally linear manner. The output is substantially sinusoidal irrespective of the nature of the periodic input.

The variations are very substantial and enable the construction of simple circuits with low or negligible power requirements such as those described above which are capable of very substantial outputs. The currents variations are produced by physical movement of the electrodes that is so slight that it is visually imperceptible. Thus the device is capable of substantially higher operating frequencies than have heretofore been associated with the more inexpensive mechanical resonators.

Without further elaboration, the foregoing will so fully explain the characteristics of my invention that others may, by applying current knowledge, readily adapt the same for use under varying conditions of service, while retaining certain features which may properly be said to constitute the essential items of novelty involved, which items are intended to be defined and secured to me by the following claims.

I claim:

1. An electromechanical transducer comprising a gas-tight envelope, an ionizable gas contained within said envelope, a pair of spaced conductive electrodes within said envelope, at least one of said electrodes being movable, said electrodes having terminal means disposed externally of said envelope, means for displacing at least one of said movable electrodes from the rest position, and means producing ionization of said gas irrespective of the relative positions of said electrodes, the magnitude of conduction therebetween being dependent upon the position of said movable electrode.

2. An electromechanical transducer comprising a gas-tight envelope, an ionizable gas contained within said envelope, a pair of spaced conductive electrodes within said envelope, at least one of said electrodes being movable, said electrodes having terminal means disposed externally of said envelope, means for displacing at least one of said movable electrodes from the rest position, means producing ionization of said gas irrespective of the relative positions of said electrodes, the magnitude of conduction therebetween being dependent upon the position of said movable electrodes, and means connected to said terminal means and sensing changes in said magnitude of conduction.

3. An electromechanical transducer comprising a gas-tight envelope, an ionizable gas contained within said envelope, a pair of spaced conductive electrodes within said envelope, at least one of said electrodes being movable, said electrodes having terminal means disposed externally of said envelope, means for displacing at least one of said movable electrodes relative to said envelope from its rest position, voltage means of sufficient magnitude applied to said terminal means to produce ionization between said electrodes, the magnitude of conduction therebetween being dependent upon the position of said movable electrode relative to said envelope, and means connected to said terminal means and sensing changes in said magnitude of conduction.

4. An electromechanical transducer comprising: a gas-tight envelope; an ionizable gas contained within said envelope; a pair of spaced conductive electrodes within said envelope, at least one of said electrodes being movable, said electrodes having terminal means disposed externally of said envelope; means for displacing at least one of said movable electrodes from its rest position; and electric circuit means connected to said terminal means and including a voltage source of sufficient magnitude to produce ionization between said electrodes irrespective of the relative positions thereof, the magnitude of conduction therebetween being a function of the position of said movable electrodes, and means connected to said terminal means and sensing changes in said magnitude of conduction.

5. The electromechanical transducer of claim 1 wherein said means for displacing the movable electrode is periodic in nature and the magnitude of conduction between the electrodes varies in a corresponding periodic manner.

6. The electromechanical transducer of claim 2 wherein said movable electrode has a natural vibratory frequency, said means for displacing the movable electrode is periodic in nature, and the magnitude of conduction between said electrodes varies sinusoidally and increases sharply when the periodicity of said displacing means is harmonically related to said frequency.

7. The electromechanical transducer of claim 6 wherein the means sensing changes in the magnitude of conduction comprises a circuit which selects the alternating current component of said conduction.

8. The electromechanical transducer of claim 1 wherein said movable electrode is a magnetically attractable electrode mounted as a cantilever and said displacing means is a source of magnetic flux.

9. The electromechanical transducer of claim 1 wherein said movable electrode is closely adjacent but spaced from said envelope.

10. The electromechanical transducer of claim 1 wherein both electrodes are mounted as cantilevers within said envelope and including restraining means, said restraining means restraining said electrodes against movement relative to one another.

11. The electromechanical transducer of claim 1 wherein said movable electrode is formed of relatively flat resilient material and mounted as a cantilever with the flat surfaces thereof generally parallel to a wall of said envelope, the displacement of said movable electrode being generally transverse to said flat surfaces.

12. The electromechanical transducer of claim 1 wherein the means for displacing the movable electrode is an electromagnetic means externally disposed but adjacent said envelope, and the movable electrode is of magnetic material.

13. A narrow band pass filter comprising an input circuit and an output circuit, an electromechanical transducer comprising a gas-tight envelope, an ionizable gas contained within said envelope, a pair of spaced conductive electrodes within said envelope, one of said electrodes being movable and having a resonant frequency, means energized from said input circuit to periodically displace said movable electrode, said output circuit including means to produce ionization between said electrodes irrespective of the position of said movable electrode, the magnitude of conduction therebetween being dependent upon the position of said movable electrode, said output circuit being connected to said electrodes whereby a substantial periodic signal is generated in said output circuit whenever said periodic displacement corresponds to said resonant frequency.

14. An oscillator comprising the electromechanical transducer of claim 1 and feedback means actuating said means for displacing the movable electrode in response to variations in the magnitude of conduction between said electrodes.

15. An electromechanical transducer comprising a generally cylindrical gas-tight envelope, an ionizable gas contained within said envelope, a pair of spaced conductive electrodes, at least one of which is magnetically attractable, an electrical circuit including a voltage source connected across said electrodes sufficient to render said gas conductive between said electrodes, magnetic means adapted to attract and move said magnetically attractable electrode, said magnetically attractable electrode being mounted as a cantilever at one end of said envelope and extending longitudinally closely adjacent one wall of said envelope, said magnetically attractable electrode having a resonant frequency and being oriented for movement generally toward and away from said wall, and means mounting said envelope for rotation about a longitudinal axis with respect to said magnetic means, relative rotation thereof producing variation in said resonant frequency.

References Cited by the Examiner

UNITED STATES PATENTS

| | | | |
|---|---|---|---|
| 2,258,437 | 10/1941 | Badgley | 313—152 |
| 2,430,482 | 11/1947 | Smith | 313—268 X |
| 2,986,702 | 5/1961 | Schrecongost | 331—187 X |
| 3,154,753 | 10/1964 | Rusy | 331—116 X |

ROY LAKE, *Primary Examiner.*

JOHN KOMINSKI, *Examiner.*